(12) United States Patent
Katsuno et al.

(10) Patent No.: US 9,688,105 B2
(45) Date of Patent: Jun. 27, 2017

(54) PNEUMATIC TIRE (71) Applicant: BRIDGESTONE CORPORATION, Tokyo (JP)

(72) Inventors: Hiroyuki Katsuno, Tokyo (JP); Satoshi Ishikawa, Tokyo (JP); Shinsaku Katayama, Tokyo (JP); Eisuke Seta, Tokyo (JP); Yoshio Kaji, Tokyo (JP); Takayuki Kurata, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 125 days.

(21) Appl. No.: 14/441,545

(22) PCT Filed: Oct. 25, 2013

(86) PCT No.: PCT/JP2013/006330
§ 371 (c)(1),
(2) Date: May 8, 2015

(87) PCT Pub. No.: WO2014/083758
PCT Pub. Date: Jun. 5, 2014

(65) Prior Publication Data
US 2015/0290978 A1    Oct. 15, 2015

(30) Foreign Application Priority Data

Nov. 30, 2012 (JP) ................................. 2012-263579
Nov. 30, 2012 (JP) ................................. 2012-263595

(51) Int. Cl.
*B60C 11/11*    (2006.01)
*B60C 11/13*    (2006.01)
(Continued)

(52) U.S. Cl.
CPC ................ *B60C 11/11* (2013.01); *B60C 5/00* (2013.01); *B60C 11/0302* (2013.04);
(Continued)

(58) Field of Classification Search
CPC ........................ B60C 11/1236; B60C 11/1384
(Continued)

(56) References Cited

U.S. PATENT DOCUMENTS 6,065,517 A     5/2000  Maruyama
2005/0072505 A1  4/2005  Takahashi

FOREIGN PATENT DOCUMENTS

CN    1462244 A    12/2003
CN    1720151 A    1/2006
(Continued)

OTHER PUBLICATIONS

International Search Report for PCT/JP2013/006330 dated Jan. 14, 2014.

*Primary Examiner* — Timothy Kennedy
(74) *Attorney, Agent, or Firm* — Sughrue Mion, PLLC (57) ABSTRACT

A pneumatic tire, comprising: a tread surface; a plurality of grooves formed in the tread surface, including a plurality of widthwise grooves each extending from a corresponding tread end on the inner side in the tread width direction and a plurality of circumferential grooves each extending in the tread circumferential direction to intersect the widthwise grooves; blocks demarcated by the plurality of grooves; and a chamfered portion formed at a corner, on the trailing edge side and on the outer side in the tread width direction, of each block.

9 Claims, 7 Drawing Sheets (51) Int. Cl.
  *B60C 11/03* (2006.01)
  *B60C 11/04* (2006.01)
  *B60C 5/00* (2006.01)
  *B60C 11/12* (2006.01)

(52) U.S. Cl.
  CPC .......... *B60C 11/04* (2013.01); *B60C 11/1236* (2013.04); *B60C 11/13* (2013.01); *B60C 11/1369* (2013.04); *B60C 11/1384* (2013.04); *B60C 2011/0344* (2013.04); *B60C 2011/0346* (2013.04); *B60C 2011/1213* (2013.04)

(58) Field of Classification Search
  USPC .................................................... 152/209.15
  See application file for complete search history.

(56) References Cited

FOREIGN PATENT DOCUMENTS

| | | |
|---|---|---|
| CN | 101352997 A | 1/2009 |
| CN | 101835636 A | 9/2010 |
| CN | 102189900 A | 9/2011 |
| CN | 102248868 A | 11/2011 |
| CN | 102529597 A | 7/2012 |
| EP | 0652119 A1 | 5/1995 |
| EP | 0715972 A2 | 6/1996 |
| EP | 0715972 B1 | 10/1998 |
| EP | 1 568 516 A1 | 8/2005 |
| EP | 2 457 746 A1 | 5/2012 |
| JP | 63-305008 A | 12/1988 |
| JP | 64-36506 A | 2/1989 |
| JP | 2-182505 A | 7/1990 |
| JP | 03-186405 A | 8/1991 |
| JP | 9-220912 A | 8/1997 |
| JP | 11263104 A * | 9/1999 |
| JP | 2001-187520 A | 7/2001 |
| JP | 2001-206020 A | 7/2001 |
| JP | 2002-29222 A | 1/2002 |
| JP | 2003-25810 A | 1/2003 |
| JP | 2003-170708 A | 6/2003 |
| JP | 2003-191716 A | 7/2003 |
| JP | 2004-231092 A | 8/2004 |
| JP | 2006-027567 A | 2/2006 |
| JP | 2009-23601 A | 2/2009 |
| JP | 4266402 B2 * | 5/2009 ......... B60C 11/1384 |
| JP | 2010-105561 A | 5/2010 |
| JP | 2010-215078 A | 9/2010 |
| JP | 2011-189846 A | 9/2011 |
| JP | 2012-76597 A | 4/2012 |
| JP | 2012-140091 A | 7/2012 |
| WO | 02/068222 A1 | 9/2002 |
| WO | 2005115770 A1 | 12/2005 |
| WO | 2012/085639 A1 | 6/2012 |

* cited by examiner

PNEUMATIC TIRE

CROSS REFERENCE TO RELATED APPLICATIONS

This application is a National Stage of International Application No. PCT/JP2013/006330 filed Oct. 25, 2013, claiming priority based on Japanese Patent Application Nos. 2012-263595 filed Nov. 30, 2012 and 2012-263579 filed Nov. 30, 2012, the contents of all of which are incorporated herein by reference in their entirety.

TECHNICAL FIELD

The present invention relates to a pneumatic tire.

BACKGROUND ART

Conventionally, a pneumatic tire employed a technique of increasing a volume of a main groove thereof and/or a technique of adjusting a slant angle of the main groove in order to improve drainability thereof (refer to PTL 1 and PTL 2, for example).

CITATION LIST

Patent Literature
  PTL 1: JP2012-140091
  PTL 2: JP2010-215078

SUMMARY

However, an increase in volume of a main groove decreases a ground contact area to deteriorate braking performance on a dry road surface, braking performance on an icy/snowy road surface, controllability and stability on a dry/icy/snowy road surface and even result in unsatisfactory wet performances of a pneumatic tire. In a case where a slant angle of a main groove is adjusted in of a pneumatic tire, there arises a problem of "trade-off" between drainability and rigidity of land portions, which problem makes it difficult for the tire to achieve good braking performance on a dry road surface, good braking performance on an icy/snowy road surface, and good controllability and stability on a dry/icy/snowy road surface in a compatible manner.

The present disclosure aims at solving the aforementioned problems and an object thereof is to provide a pneumatic tire exhibiting improved drainability without sacrificing running performances on a dry road surface.

As a result of a keen study made by the inventors to achieve the object, they newly discovered that suppressing occurrence of turbulences in a drainage process of water to improve flow properties of water is very effective in terms of improving drainability. The inventors also discovered that forming a chamfered portion at a specific corner of each block effectively suppresses occurrence of turbulences in a groove, while ensuring a satisfactorily large actual ground contact area.

Our pneumatic tire, based on the discoveries described above, has following primary structures. The pneumatic tire comprises: a plurality of grooves including a plurality of widthwise grooves and a plurality of circumferential grooves formed in a tread surface; blocks demarcated by the plurality of grooves; and a chamfered portion formed at a corner, on the trailing edge side and on the outer side in the tread width direction, of each block.

A "tread surface" represents an outer peripheral surface over the entire circumference of the tire, which surface is to be in contact with a road surface when the tire, assembled with a prescribed rim and inflated at the prescribed internal pressure with load corresponding to the maximum loading capacity exerted thereon, is rotated on the road surface. Further, a "tread end" represents each outermost position in the tread width direction of the tread surface described above in the present specification. In this connection, a "prescribed rim" represents a rim prescribed for each tire by an industrial standard which is valid in an area where the tire is manufactured and used, and examples thereof include: a standard rim in "Year Book" of JATMA (The Japan Automobile Tyre Manufacturers Association, Inc.); "Design Rim" in "Year Book" of TRA (THE TIRE and RIM ASSOCIATION INC.); and "Measuring RIM" in "STANDARD MANUAL" of ETRTO (European Tyre and Rim Technical Organisation), "Prescribed internal pressure" represents internal air pressure (the maximum air pressure) of a tire corresponding to the maximum loading capacity of the tire prescribed according to the tire size by an industrial standard such as JATMA. "The maximum loading capacity" represents the maximum loading capacity of a tire prescribed according to the tire size by an industrial standard such as JATMA. Further, a widthwise groove "extending on the inner side in the tread width direction" may represent a widthwise groove extending on the inner side in the tread width direction to be inclined with respect to the tread width direction, as well as a widthwise groove extending on the inner side in the tread width direction without being inclined with respect to the tread width direction, in the present specification. Yet further, a circumferential groove "extending on the circumferential direction" may represent a circumferential groove extending to be inclined with respect to the circumferential direction, as well as a circumferential groove extending in parallel to the circumferential direction, in the present specification. Yet further, a "radius of curvature" of a chamfered portion is Obtained as an approximate value from an arc in a developed view of a tread surface by the least-squares method in the present specification. Yet further, a "groove width" represents a width of an opening of a groove at a tread surface in a state where a tire has been assembled with a prescribed rim and inflated at the prescribed internal pressure with no load exerted thereon in the present specification. Yet further, a "tire center portion" represents, provided that a tread ground contact width is a distance between respective ends in the tire width direction of a ground contact surface in a state where a tire has been assembled with a prescribed rim and inflated at the prescribed internal pressure with load corresponding to the maximum loading capacity exerted thereon, a region spreading over a width of 0.2× the tread ground contact width with the tire equatorial plane CL situated in the middle thereof (i.e. a region constituted of sub-respective regions spreading from the tire equatorial plane on respective sides in the tread width direction each over a width of 0.1× the tread ground contact width) in the present specification.

Accordingly, it is possible to provide a pneumatic tire exhibiting improved drainability without sacrificing running performances on a dry road surface.

BRIEF DESCRIPTION OF THE DRAWINGS

In the accompanying drawings.

DETAILED DESCRIPTION

Our pneumatic tire according to one embodiment thereof (which tire will be referred to simply as a "tire" hereinafter) will be demonstratively described below in detail with reference to the drawings. Explanation of the internal structures of the tire, however, will be omitted because they are similar to those of the conventional tires.

Figure 1:
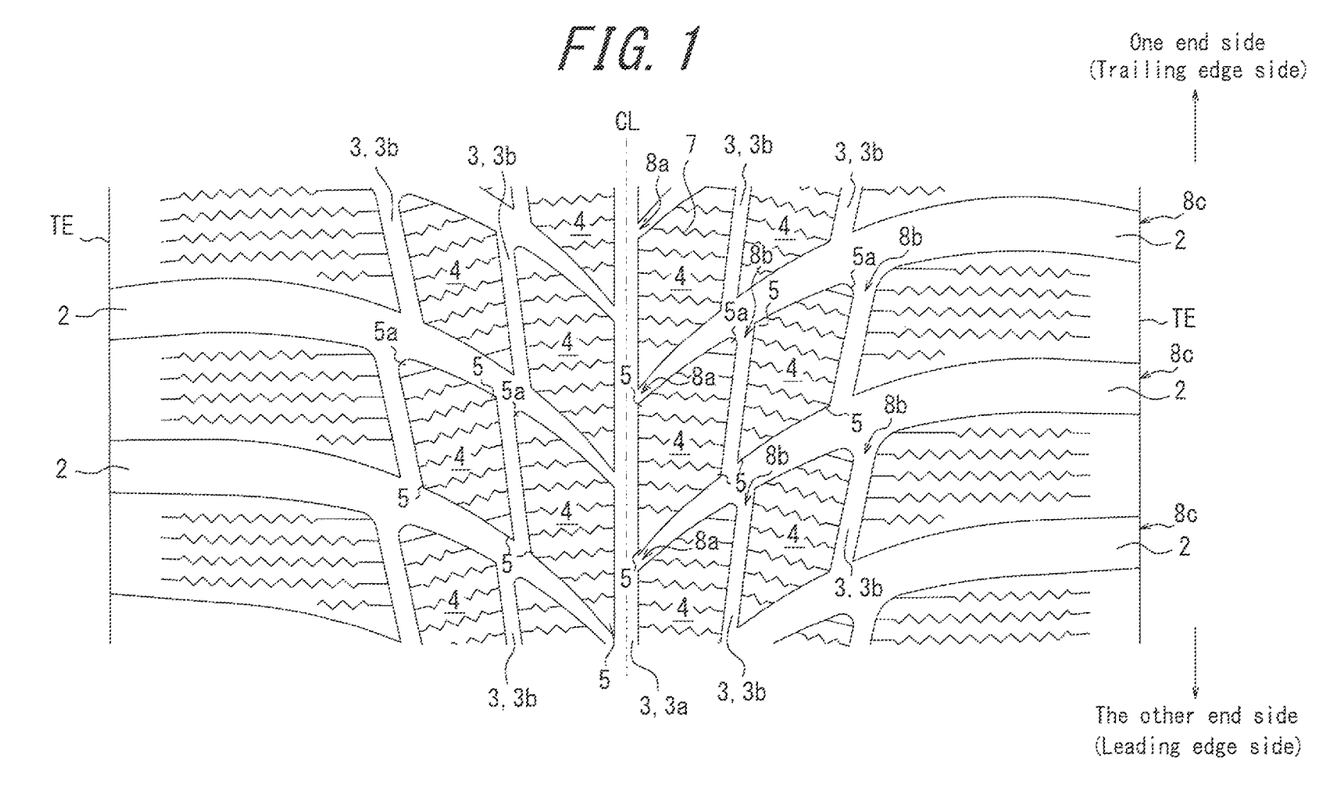
FIG. 1 is a developed view showing a tread surface according to one embodiment of our pneumatic tire.

FIG. 1 is a developed view showing a tread surface of our tire according to one embodiment thereof. Specifically, FIG. 1 is a view showing in a developed manner a tread surface of the tire assembled with a prescribed rim and inflated at the prescribed internal pressure with no load exerted thereon. The tire has a plurality of widthwise grooves 2 each extending on the inner side in the tread width direction from a corresponding tread end TE and a plurality of circumferential grooves 3 each extending in the tread circumferential direction to intersect the widthwise grooves 2 in a tread surface 1, as shown in FIG. 1. Each widthwise groove 2 extends on the inner side in the tread width direction from the corresponding tread end TE to be inclined with respect to the tread width direction such that a slant angle thereof with respect to the tread with direction gradually increases toward the inner side in the tread width direction in an example shown in FIG. 1. Further, each widthwise groove 2 gradually increases a groove width thereof toward the outer side in the tread width direction in the shown example. Yet further, of the plurality of circumferential grooves 3, a circumferential groove 3a extends in the tread circumferential direction in the tire center portion (on the tire equatorial plane CL in the shown example) and other circumferential grooves 3b each extend, provided that portions of the widthwise grooves 2 demarcating block corner portions 5 extend on "one side in the tread circumferential direction" toward the outer side in the tread width direction in the shown example, from the one side to the other side in the tread circumferential direction so as to be inclined on the inner side with respect to the tread width direction. Respective ends of each circumferential groove 3b communicate with the corresponding two widthwise grooves 2 adjacent to each other in the tread circumferential direction. The tire may have other grooves than the widthwise grooves 2 and the circumferential grooves 3 in the tread surface 1, although the tire has only the widthwise grooves 2 and the circumferential grooves 3 as grooves in the tread surface 1 in the shown example.

A plurality of blocks 4 are demarcated by a plurality of grooves (the widthwise grooves 2 and the circumferential grooves 3 in the shown example) in the tire. Each block 4 has an acute angle corner portion 5a on the one side in the tread circumferential direction and the outer side in the tread width direction, another acute angle corner portion 5 on the other side in the tread circumferential direction and the inner side in the tread width direction, an obtuse angle corner portion 5 on the one side in the tread circumferential direction and the inner side in the tread width direction, and another obtuse angle corner portion 5 on the other side in the tread circumferential direction and the outer side in the tread width direction in the shown example. Only the acute angle corner portion 5a on the one side in the tread circumferential direction and the outer side in the tread width direction, of the corner portions 5 of each block 4, is provided with a chamfered portion 6 such that the corner portion 5a is rounded by the chamfered portion 6 in the shown example. Each block 4 has a plurality of sipes 7 each extending in a zig-zag manner in the shown example. A "chamfered portion" represents a spatial portion which can be formed, for example, by actually chamfering a block 4. How the chamfered portion is formed, however, does not matter as long as the chamfered portion 6 takes on a chamfered configuration. It is important in the tire that at least the corner portion 5a on the one side in the tread circumferential direction and the outer side in the tread width direction, of the corner portions 5 of at least one block 4, is provided with the chamfered portion 6. An effect caused when the aforementioned tire is mounted on a vehicle such that the one side in the tread circumferential direction of the tire corresponds to the trailing edge side of the blocks thereof will be described hereinafter.

According to the tire of the present embodiment, it is possible to suppress turbulences of water in the vicinity of the acute angle corner portion 5a and enhance an effect of draining water from the inner side toward the outer side in the tread width direction through the widthwise grooves 2 as the main water flow paths, thereby improving the drainage performance of the tire, because at least the acute angle corner portion 5a on the one side in the tread circumferential direction (i.e. the trailing edge side of each block) and the outer side in the tread width direction, of the corner portions 5 of the block 4, is provided with the chamfered portion 6. Further, it is possible to ensure good running performances on a dry/icy/snowy road surface because the chamfered portion 6 is formed at a corner portion 5a and therefore an actual ground contact area of the tire hardly decreases.

It is preferable to form the chamfered portion 6 only at the corner portion 5a on the one side in the tread circumferential direction and the outer side in the tread width direction, of at least one block 4, in the tire, as shown in FIG. 1. In other words, it is preferable not to form the chamfered portion 6 at either the corner portion 5 on the one side in the tread circumferential direction and the inner side in the tread width direction or the two corner portions 5 on the other side in the tread circumferential direction. In a case where the tire is mounted on a vehicle such that the one side in the tread circumferential direction thereof corresponds to the trailing edge side of each block and the other side in the tread circumferential direction thereof corresponds to the leading edge side of each block, formation of the chamfered portions 6 at the corner portions 5 on the leading edge side of each block increases water flow from the widthwise grooves 2 to the circumferential grooves 3b and generates water turbulences, thereby possibly deteriorating the drainage performance through the widthwise grooves 2 as the main water flow paths. The drainage performance can be improved by formation of the chamfered portion 6 only at the aforementioned corner portion 5a in this regard. Formation of the chamfered portion 6 at the corner portion 5 on the one side in the tread circumferential direction (i.e. the trailing edge side of each block) and the inner side in the tread width direction somehow improves the drainage performance but decrease rigidity of the block on the trailing edge side thereof, thereby possibly deteriorating running performances and the like on a dry road surface. The running performances and the like on a dry road surface can be ensured by formation of the chamfered portion 6 only at the aforementioned corner portion 5a in this regard.

The corner portion 5a provided with the chamfered portion 6 is preferably rounded, as shown in the example of FIG. 1, in the tire. Forming the chamfered portion such that the corner portion is rounded most effectively suppresses turbulences of water and also hardly decreases a ground contact area of the tire. In this connection, a radius of curvature R of the rounded corner portion 5a is preferably in the range of 0.5 mm to 4.0 mm. The radius of curvature R≥0.5 mm can effectively suppress the aforementioned water turbulences at the corner portion 5a and satisfactorily cause an effect of improving the drainage performance through the widthwise grooves 2 as the main water flow paths. The radius of curvature R≤4.0 mm can suppress a decrease in ground contact area of the tire.

Figure 2A:
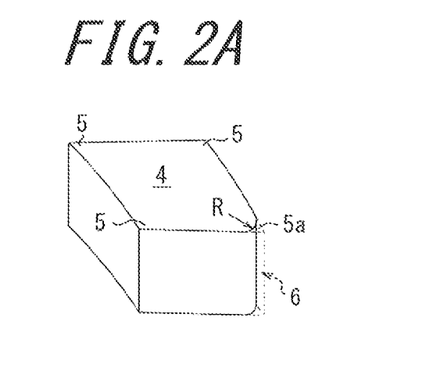
FIGS. 2A-2C are views each explaining a configuration of a chamfered portion.
Figure 2B:
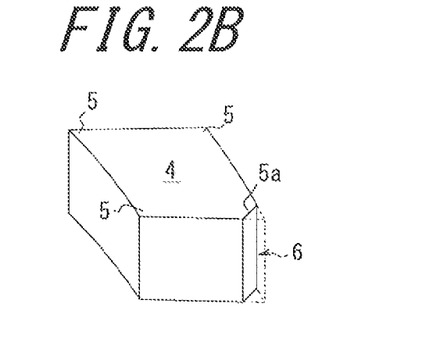
Figure 2C:
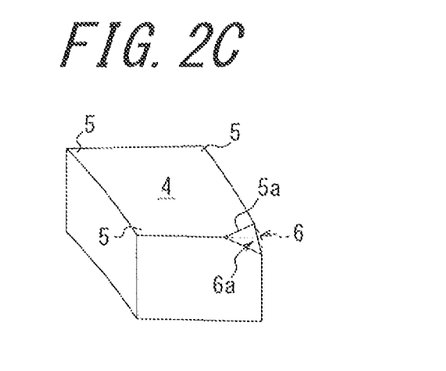

The chamfered portion 6 may alternatively be formed such that the corner portion 5a of each block 4 is not rounded, as shown in e.g. FIG. 2B (the chamfered portion 6 has a triangular prism-like configuration in FIG. 2B), in the tire, although the chamfered portion 6 is formed such that the corner portion 5a is rounded to have a predetermined radius of curvature R in FIG. 1 and FIG. 2A. Yet alternatively, a tapered portion 6a may be formed as the chamfered portion 6a such that the corner portion 5a is partially chamfered on the tread surface side only in a portion in the block height direction thereof, as shown in FIG. 2C (the chamfered portion 6 has a tetrahedron-like configuration in this case). The tapered portion 6a is preferably formed such that it has a configuration in which 5% to 10% of the block height, measured from the tread surface 1 side, has been chamfered because then a decrease in rigidity of the block can be suppressed.

In the case where the corner portion 5a of each block 4 is rounded to have a predetermined radius of curvature R as shown in FIG. 1 and FIG. 2A, for at least one of pairs of respective two blocks 4 adjacent to each other in the tread width direction in the same half region of the tread surface, spreading from the tire equatorial plane CL to the corresponding tread end TE in the tread width direction, a radius of curvature R1 (mm) of the corner portion 5a having the chamfered portion 6 formed therein of one block 4 situated on the outer side in the tread width direction, of the two blocks 4 of each pair, is preferably larger than a radius of curvature R2 (mm) of the corner portion 5a having the chamfered portion 6 formed therein of the other block 4 situated on the inner side in the tread width direction, of the two blocks 4 of the pair. It is possible to facilitate flow properties of water on the outer side in the tread width direction to further improve the drainage performance of the tire by the arrangement described above.

Provided that a cross sectional area of a connection portion 8a at which an inner end portion in the tread with direction of each widthwise groove 2 is connected with the circumferential groove 3a is A (mm$^2$) and a cross sectional area of a connection portion 8c at which an outer end portion in the tread with direction of the widthwise groove 2 is connected with the corresponding tread end TE is C (mm$^2$), it is preferable that A<C in the tire, as shown in FIG. 1 and FIGS. 3A-3C. It is possible to suppress occurrence of water turbulences triggered by an increase in water flowing from the circumferential groove 3a to the widthwise grooves 2 to merge with water in the widthwise groove 2, thereby enhancing the water draining effect through the widthwise grooves 2 as the main water flow paths and thus the drainage performance of the tire, by reducing the cross sectional area A on the inlet side of water flowing through each widthwise groove 2 and increasing the cross sectional area C on the exit side of water flowing through the widthwise groove 2. For the similar reasons, a ratio A/C is preferably ≤0.24 and more preferably ≤0.17. However, the ratio A/C is preferably ≥0 in terms of ensuring a satisfactorily large ground contact area and good running performances and the like on a dry road surface. The case where A=0 represents that the widthwise groove 2 is connected with the circumferential groove 3a at a connection portion 8a having a groove width of 0 mm such that the blocks 4 demarcated by the widthwise groove 2 are sectioned in the tread circumferential direction at the connection portion. It is preferable that a groove width of each widthwise groove 2 gradually increases toward the outer side in the tread width direction in the tire, as shown in FIG. 1. It is possible to facilitate flow properties of water from the tire center side toward the tire shoulder side to further improve the drainage performance of the tire by the arrangement described above. In this connection, specifically, it is preferable that the groove with of each widthwise groove 2 is in the range of 0 mm to 2.0 mm at the inner end portion thereof in the tread width direction and in the range of 9.0 mm to 12.0 mm at the corresponding tread end TE. Further, provided that a cross sectional area of a connection portion 8b at which an end, on the one end side in the tread circumferential direction, of the circumferential groove 3b is connected with the corresponding widthwise groove 2 is B (mm$^2$), it is preferable that B<C in the tire. It is possible to suppress occurrence of water turbulences triggered by an increase in water flowing from the circumferential groove 3b to the widthwise grooves 2 to merge with water in the widthwise grooves 2, thereby enhancing the water draining effect through the widthwise grooves 2 as the main water flow paths by setting B to be smaller than C. For the similar reasons, a ratio B/C is preferably ≤0.60 and more preferably ≤0.42. However, the ratio B/C is preferably ≥0.07 and more preferably ≥0.10 in terms of ensuring a satisfactorily high drainage rate of water through the circumferential grooves 3b. The cross sectional area A represents a cross sectional area of a cross section in the tire circumferential direction of the connection portion 8a at which the widthwise groove 2 is connected with the circumferential groove 3a, the cross sectional area B represents a cross sectional area of a cross section in the tire circumferential direction of the connection portion 8b at which the circumferential groove 3b is connected with the corresponding widthwise groove 2, and the cross sectional area C represents a cross sectional area of a cross section in the tire circumferential direction of the connection portion 8c at which the widthwise groove 2 is connected with the corresponding tread end TE. In a case where each widthwise groove 2 communicates with a plurality of the circumferential grooves 3a, as shown in FIG.

Figure 12:
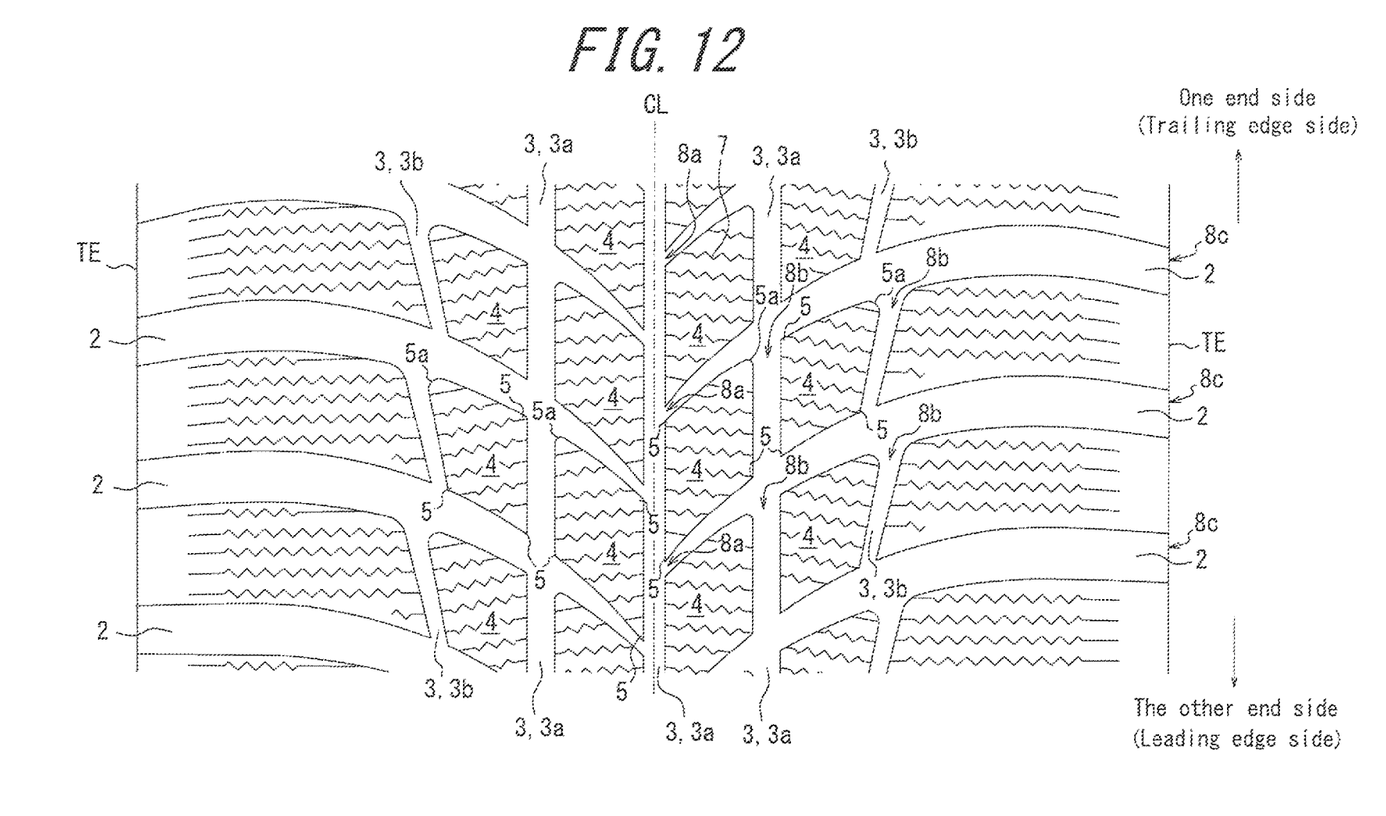
FIG. 12 is a developed view showing a tread surface according to another embodiment of our tire.

12, the cross sectional area A represents a cross sectional area of the connection portion at which the widthwise groove 2 is connected with the circumferential groove 3a situated on the innermost side in the tread width direction of the plurality of the circumferential grooves 3a.

The cross sectional area A is preferably in the range of 0 mm² to 18 mm². Setting the cross sectional area A to be ≥0 mm² improves on-snow fraction performance of the tire, and setting the cross sectional area A to be ≤18 mm² suppresses occurrence of water turbulences described above and thus successfully enhances the water drainage effect through the widthwise grooves 2 as the main water flow paths. The cross sectional area B is preferably in the range of 8 mm² to 46 mm². Setting the cross sectional area B to be ≥8 mm² suppresses snow clogging and ensures a satisfactory water drainage rate through the circumferential grooves 3b, and setting the cross sectional area B to be ≤46 mm² suppresses occurrence of water turbulences described above and thus successfully enhances the water drainage effect through the widthwise grooves 2 as the main water flow paths. The cross sectional area C is preferably in the range of 77 mm² to 110 mm². Setting the cross sectional area C to be ≥77 mm² ensures a satisfactorily high water flow rate through the widthwise grooves 2 as the main water flow paths and improves the water drainage performance of the tire, and setting the cross sectional area C to be ≤110 mm² ensures a satisfactorily large ground contact area and thus good running performances on a dry road surface.

Figure 3A:
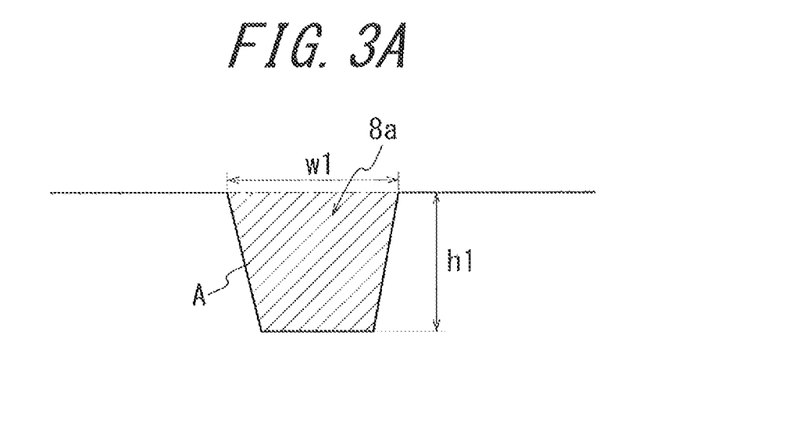
FIGS. 3A-3C are views explaining cross sectional areas A, B, C, respectively.
Figure 4A:
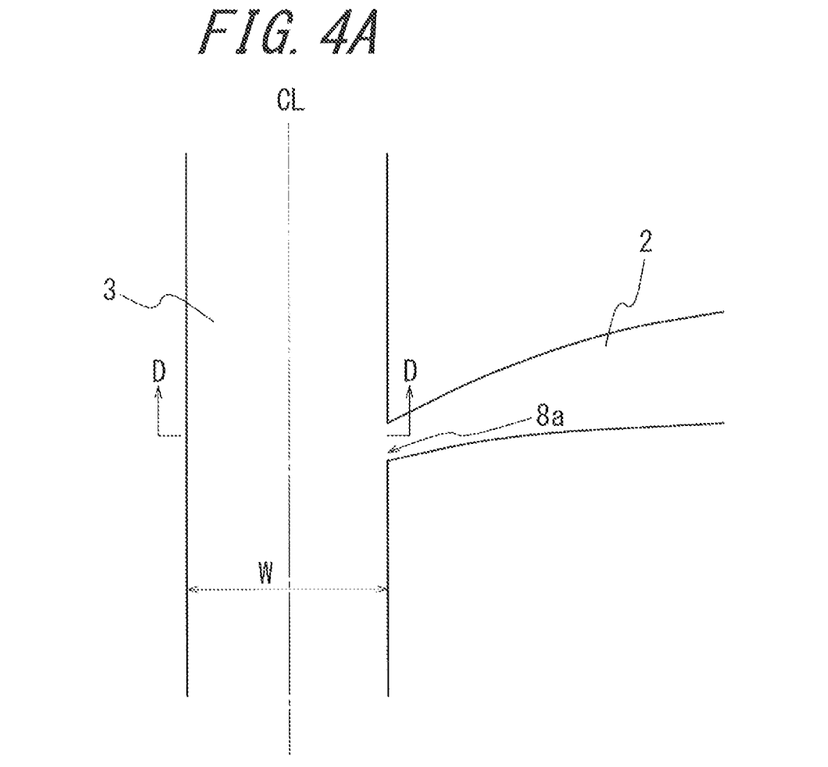
FIG. 4A is a plan view for explaining a case where a widthwise groove is provided with a raised-bottom portion.

A groove width w1 at a cross section of the connection portion 8a at which the inner end portion in the tread width direction of each widthwise groove 2 is connected with the circumferential groove 3a is preferably in the range of 0 mm to 2 mm, as shown in FIG. 3A. Setting the groove width w1 to be ≥0 mm improves on-snow fraction performance and ensures a satisfactorily large ground contact area and thus good running performances on a dry road surface of the tire. Setting the groove width w1 to be ≤2 mm suppresses occurrence of water turbulences described above and thus successfully enhances the water drainage effect through the widthwise grooves 2 as the main water flow paths. A groove depth (the maximum depth) h1 at a cross section of the connection portion 8a of each widthwise groove 2 is preferably in the range of 1 mm to 9.2 mm. Setting the groove depth h1 to be ≥1 mm ensures good drainage performance, and setting the groove depth h1 to be ≤9.2 mm ensures a satisfactorily high block rigidity and thus good on-snow performance of the tire. In connection with the groove depth of the widthwise groove, a raised-bottom portion 9 may be formed in the connection portion 8a at which the inner end portion in the tread width direction of each widthwise groove 2 is connected with the circumferential groove 3a, as shown in FIG. 4A and a cross sectional view of FIG. 4B. The maximum depth h4 at a portion other than the raised-bottom portion 9, of the widthwise groove 2, is preferably in the range of 1 mm to 9.2 mm. Setting the groove depth h4 to be ≥1 mm ensures good drainage performance, and setting the groove depth h4 to be ≤9.2 mm ensures a satisfactorily high block rigidity and thus good on-snow performance of the tire.

Figure 3B:
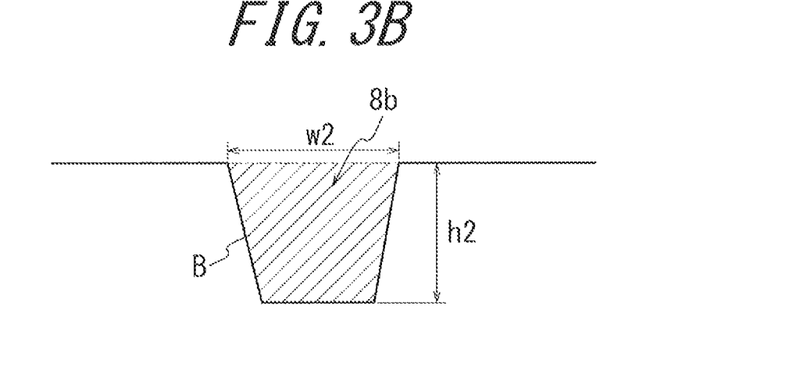

Further, a groove width w2 at a cross section of the connection portion 8b at which an end, on the one side in the tread circumferential direction, of the circumferential groove 3b is connected with the corresponding widthwise groove 2 is preferably in the range of 2 mm to 5 mm, as shown in FIG. 3B. Setting the groove width w2 to be ≥2 mm suppresses snow clogging and ensures a satisfactory water drainage rate through the circumferential grooves 3b, and setting the groove width w2 to be ≤5 mm suppresses occurrence of water turbulences described above and thus successfully enhances the water drainage effect through the widthwise grooves 2 as the main water flow paths. A groove depth (the maximum depth) h2 at a cross section of the connection portion 8b of each circumferential groove 3b is preferably in the range of 4 mm to 9.2 mm, as shown in FIG. 3B. Setting the groove depth h2 to be ≥4 mm ensures good drainage performance, and setting the groove depth h2 to be ≤9.2 mm ensures a satisfactorily high block rigidity and thus good on-snow performance of the tire. In the present embodiment, in a case where there exist two or more circumferential grooves 3b each communicating the corresponding two widthwise grooves 2 adjacent to each other in the tread circumferential direction, as shown in FIG. 1, it is preferable that a groove depth of the circumferential groove 3b on the inner side in the tread width direction is larger than a groove depth of the circumferential groove 3b on the outer side in the tread width direction. The blocks can then satisfactorily cause edge effects thereof to improve on-snow performance of the tire.

Figure 3C:
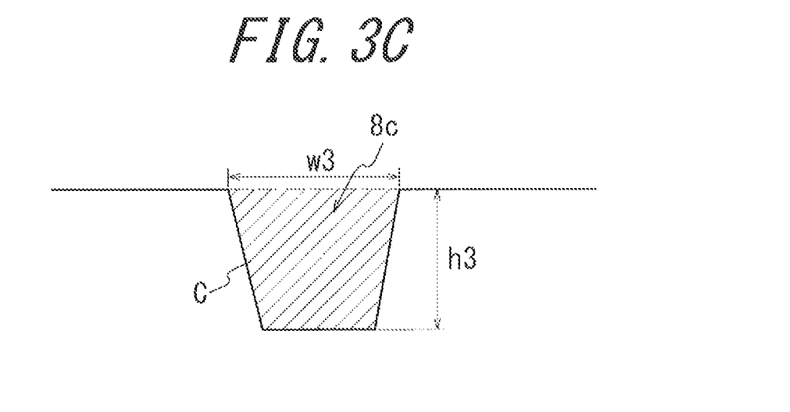

A groove width w3 at a cross section of the connection portion 8c at which the outer end portion in the tread width direction of each widthwise groove 2 is connected with the corresponding tread end TE is preferably in the range of 9 mm to 12 mm, as shown in FIG. 3C. Setting the groove width w3 to be ≥9 mm ensures a satisfactorily high flow rate of water flowing through the widthwise grooves 2 as the main water flow paths, thereby improving drainage performance. Setting the groove width w3 to be ≤12 mm ensures a satisfactorily large ground contact area and thus good running performances on a dry road surface of the tire. A groove depth (the maximum depth) h3 at a cross section of the connection portion 8c of each widthwise groove 2 is preferably in the range of 7.0 mm to 9.2 mm. Setting the groove depth h3 to be ≥7.0 mm ensures good drainage performance, and setting the groove depth h3 to be ≤9.2 mm ensures a satisfactorily high block rigidity and thus good on-snow performance of the tire.

The cross sectional area A and the cross sectional area B preferably satisfy a relationship of A<B in the tire. The blocks can satisfactorily cause edge effects thereof in the lateral direction to improve on-snow performance of the tire when the cross sectional area B is larger than the cross sectional area A.

Figure 4B:
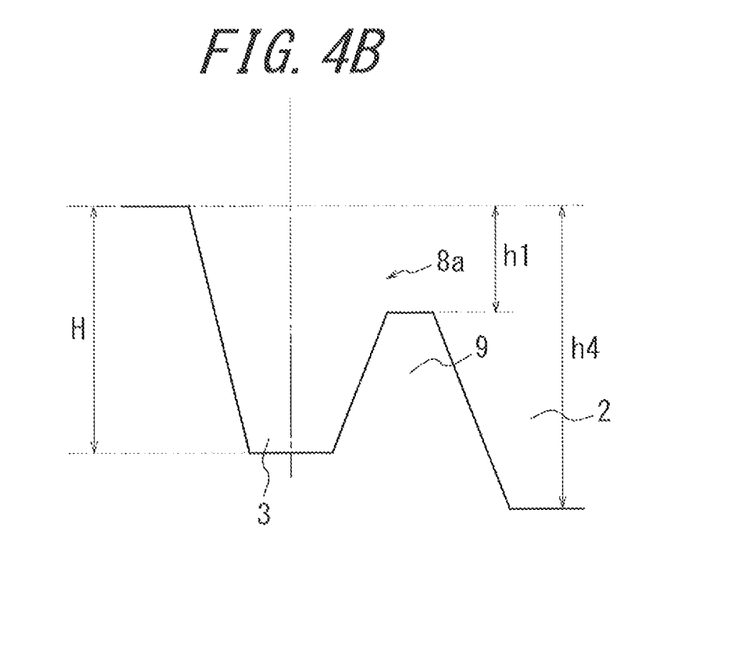
FIG. 4B is a cross sectional view cut along D-D shown in FIG. 4A.

The circumferential grooves 3 and the widthwise grooves 2 may share the same depth or the depths thereof may differ therebetween, as shown in FIG. 4A and FIG. 4B.

The widthwise groove 2 may be provided with the raised-bottom portion 9, as shown in FIG. 4A and FIG. 4B. Although a groove depth of each widthwise groove 2 and a groove depth of each circumferential groove 3 are not specifically restricted, it is preferable that the widthwise groove 2 is shallower than the circumferential groove 3 at the raised-bottom portion 9 of the widthwise groove 2 and deeper than the circumferential groove 3 at portions other than the raised-bottom portion 9 of the widthwise groove 2. The raised-bottom portion 9 blocks water and prevents a large amount of water in the circumferential groove 3 from merging with water in the widthwise groove 2, thereby suppressing occurrence of water turbulences. On the other hand, the portions other than the raised-bottom portion 9 of the widthwise groove 2 ensure a satisfactorily high drainage rate of water through the widthwise groove 2. These two effects synergically improve water drainage performance of the tire.

One of the plurality of circumferential grooves preferably extends in the tread circumferential direction in the tire center portion of the tire because then drainage performance can be improved in the tire center portion subjected to a relatively high ground contact pressure.

It is preferable that each widthwise groove 2 extends either in the tread width direction or to be inclined with respect to the tread width direction at an angle of ≤45° in the tire. The widthwise grooves 2 extending in a direction of water flow during rotation of the tire improve drainage properties of the tire. A groove depth (the maximum depth) of the widthwise groove 2 is preferably in the range of 1.0 mm to 9.2 mm in terms of ensuring a satisfactorily large groove volume for drainage. Further, the widthwise grooves 2 are disposed at a pitch interval in the tread circumferential direction preferably in the range of 16 mm to 20 mm in terms of achieving good drainage properties, braking performance on a dry road surface, braking performance on an icy/snowy road surface, controllability and stability on a dry/icy/snowy road surface of the tire in a compatible manner. The widthwise grooves 2 are disposed preferably to have a difference in phase in the tread circumferential direction between respective half regions of the tread surface sectioned by the tire equatorial plane CL therebetween because then pattern noise of the tire is reduced.

It is preferable that each circumferential groove 3 extends either in the tread circumferential direction or to be inclined with respect to the tread circumferential direction at an angle in the range of 0≤ and ≤45°. The circumferential groove 3 extending in such a manner can achieve good controllability and stability on an icy/snowy road surface and drainage properties of the tire in a compatible manner. A groove width of the circumferential groove 3 is preferably in the range of 2.0 mm to 10.0 mm in terms of achieving good drainage properties, braking performance on a dry road surface, braking performance on an icy/snowy road surface, controllability and stability on a dry/icy/snowy road surface of the tire in a compatible manner. Further, a groove depth (the maximum depth) of the circumferential groove 3 is preferably in the range of 4.0 mm to 9.2 mm in terms of achieving good drainage properties, braking performance on a dry road surface, braking performance on an icy/snowy road surface, controllability and stability on a dry/icy/snowy road surface of the tire in a compatible manner. The circumferential groove 3 may extend either continuously in the tread circumferential direction like the circumferential groove 3a shown in FIG. 1 or discontinuously in the tread circumferential direction like the circumferential grooves 3b shown in FIG. 1, which are a plurality of circumferential grooves each independently being connected with the two corresponding widthwise grooves adjacent to each other in the tread circumferential direction.

A negative ratio of the tread surface (a ratio of a groove area in the tread surface with respect to the total tread surface area) is preferably in the range of 33% to 40% in the tire in terms of achieving good drainage properties, braking performance on a dry road surface, braking performance on an icy/snowy road surface, controllability and stability on a dry/icy/snowy road surface of the tire in a compatible manner. Further, it is preferable that the total groove area of the widthwise grooves is larger than the total groove area of the circumferential grooves and that the total groove area of the widthwise grooves occupies at least 50% of the total groove area of the tire in terms of causing the widthwise grooves 2 to satisfactorily function as the main water flow paths.

The foregoing descriptions of the embodiment makes no restriction to our tire. In this connection, the tire may have three circumferential grooves 3a extending in the tread circumferential direction, as shown in FIG. 12. In this case, one circumferential groove 3b may be formed between each pair of the two widthwise grooves adjacent to each other in the tread circumferential direction, as shown in FIG. 12; and the cross sectional area A represents a cross sectional area of a connection portion at which the widthwise groove 2 is connected with the circumferential groove 3a situated at the center in the tread width direction of the three circumferential grooves 3a. In other words, in a case where each widthwise groove 2 is connected with a plurality of the circumferential grooves 3a, the cross sectional area A represents a cross sectional area of a connection portion at which the widthwise groove 2 is connected with the circumferential groove 3a situated on the innermost side in the tread width direction of these circumferential grooves 3a.

EXAMPLES

Test tires of Examples 1 to 10 and Comparative Examples 1 to 4 were prepared in order to confirm an effect of our tire. The relevant characteristics of each of the test tires are shown in Table 1. Each test tire has a tread pattern shown in the relevant drawing thereof (see Table 1 as for the correspondency). The test tires share basically the same tread pattern as shown in FIG. 1, except that each test tire has specific tread surface configurations of blocks according to the relevant drawing thereof. FIGS. 5 to 11 each show only such specific tread surface configurations of blocks in this regard. In Table 1, "Corner portions A1, A2" represent corner portions on the one side in the tread circumferential direction and the outer side in the tread width direction of the blocks, respectively. "Corner portions B1, B2" represent corner portions on the one side in the tread circumferential direction and the inner side in the tread width direction of the blocks, respectively. "Corner portions C1, C2" represent corner portions on the other side in the tread circumferential direction and the inner side in the tread width direction of the blocks, respectively. "Corner portions D1, D2" represent corner portions on the other side in the tread circumferential direction and the outer side in the tread width direction of the blocks, respectively. Further, with regard to the item "Groove width of widthwise groove" in Table 1, "Gradually increasing" represents that a groove width of each widthwise groove gradually increases toward the outer side in the tread width direction; and "Not gradually increasing" represents that a groove width of each widthwise groove is substantially constant. Each of the test tires was subjected to a test for evaluating running performances thereof on a dry road surface and a test for evaluating drainage properties thereof, as described below. In the tests described below, each test tire was mounted on a vehicle such that "the one side in the tread circumferential direction" corresponded to the trailing edge side of the blocks, for evaluation.

<Running Performances on Dry Road Surface>

Running performances of each test tire were evaluated by assembling the tire having the tire size: 205/55R16 with a prescribed rim, inflating the tire thus assembled with the rim at internal pressure of 220 kPa, and comparatively assessing controllability and stability of the tire on a dry road surface-handling course. Specifically, evaluation was made by converting the result of each test tire to an index value relative to the result of Comparative Example 1 being "100". The larger index value represents the better running performances on a dry road surface of the tire.

<Drainage Performance>

Drainage performance of each test tire was evaluated by assembling the tire having the tire size: 205/55R16 with a prescribed rim, inflating the tire thus assembled with the rim at internal pressure of 220 kPa, making the tire accelerate on a wet road surface covered with water (water depth: 7 mm), and determining the speed at which hydroplaning phenomenon occurred, for comparison. Specifically, evaluation was made by converting the result of each test tire to an index value relative to the result of Comparative Example 1 being "100". The larger index value represents the better drainage performance of the tire.

TABLE 1

Figure 5:
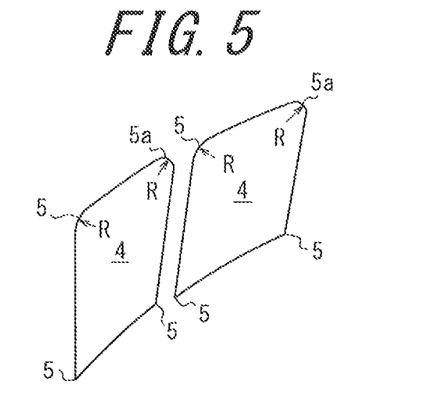
FIG. 5 is a view showing a tread surface configuration of a block of an Example tire.
Figure 6:
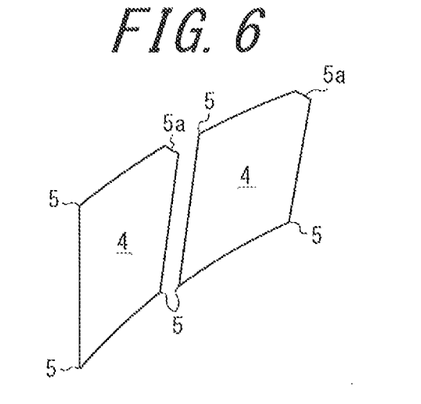
FIG. 6 is a view showing a tread surface configuration of a block of another Example tire.
Figure 7:
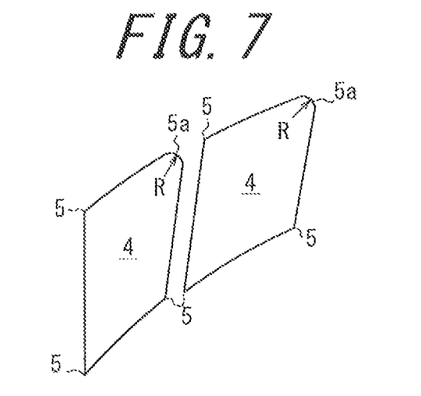
FIG. 7 is yet a view showing a tread surface configuration of a block of yet another Example tire.
Figure 8:
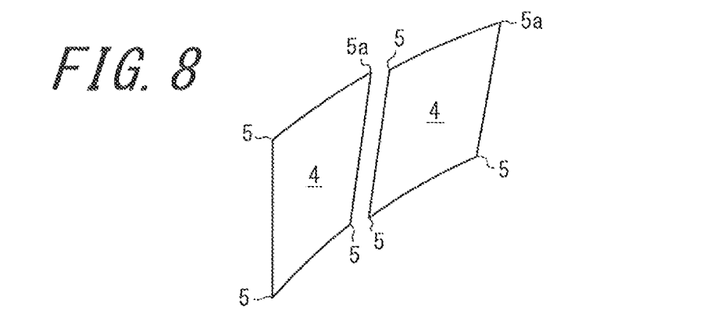
FIG. 8 is a view showing a tread surface configuration of a block of a Comparative Example tire.
Figure 9:
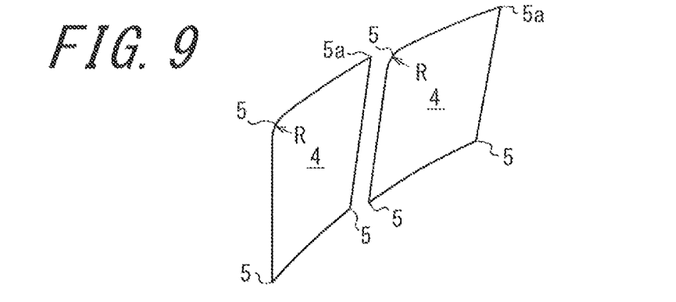
FIG. 9 is a view showing a tread surface configuration of a block of another Comparative Example tire.
Figure 10:
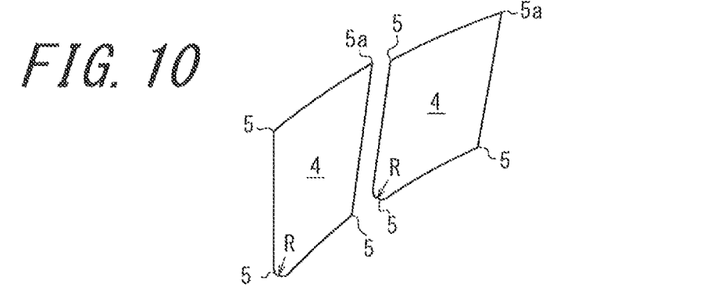
FIG. 10 is a view showing a tread surface configuration of a block of yet another Comparative Example tire.
Figure 11:
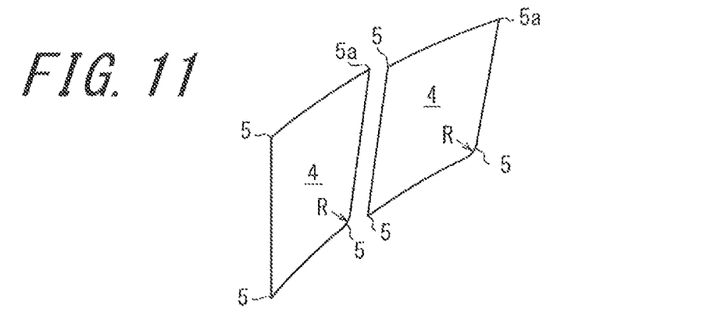
FIG. 11 is a view showing a tread surface configuration of a block of yet another Comparative Example tire.

| | | | Example 1 | Example 2 | Example 3 | Example 4 | Example 5 | Example 6 | Example 7 |
|---|---|---|---|---|---|---|---|---|---|
| Relevant drawing | | | FIG. 1 | FIG. 5 | FIG. 6 | FIG. 6 | FIG. 7 | FIG. 1 | FIG. 1 |
| Chamfered portion | | | Present | Present | Present | Present | Present | Present | Present |
| Location of chamfered portion | | | Corner portions A1, A2 only | Corner portions B1, B2 only | Corner portions A1, A2 only | Corner portions A1, A2 only | Corner portions A1, A2 only | Corner portions A1, A2 only | Corner portions A1, A2 only |
| Configuration of chamfered portion | | | FIG. 2A | FIG. 2A | FIG. 2B | FIG. 2C | FIG. 2A | FIG. 2A | FIG. 2A |
| Radius of curvature of rounded corner portion (mm) | Block on outer side in tread width direction | Corner portion A1 | 2 | 2 | — | — | 2 | 0.4 | 0.5 |
| | | Corner portion B1 | — | 2 | — | — | — | — | — |
| | | Corner portion C1 | — | — | — | — | — | — | — |
| | | Corner portion D1 | — | — | — | — | — | — | — |
| | Block on inner side in tread width direction | Corner portion A2 | 1.5 | 1.5 | — | — | 2 | 0.3 | 0.4 |
| | | Corner portion B2 | — | — | — | — | — | — | — |
| | | Corner portion C2 | — | — | — | — | — | — | — |
| | | Corner portion D2 | — | — | — | — | — | — | — |
| Groove width of widthwise groove | | | Gradually increasing | Gradually increasing | Gradually increasing | Gradually increasing | Gradually increasing | Gradually increasing | Gradually increasing |
| Drainage properties (INDEX) | | | 104 | 101 | 104 | 105 | 103 | 102 | 103 |
| Running performances on dry road surface (INDEX) | | | 100 | 100 | 100 | 100 | 100 | 100 | 100 |

| | | | Example 8 | Example 9 | Example 10 | Comp. Example 1 | Comp. Example 2 | Comp. Example 3 | Comp. Example 4 |
|---|---|---|---|---|---|---|---|---|---|
| Relevant drawing | | | FIG. 1 | FIG. 1 | — | FIG. 8 | FIG. 9 | FIG. 10 | FIG. 11 |
| Chamfered portion | | | Present | Present | Present | Absent | Present | Present | Present |
| Location of chamfered portion | | | Corner portions A1, A2 only | Corner portions A1, A2 only | Corner portions A1, A2 only | — | Corner portions B1, B2 | Corner portions C1, C2 | Corner portions D1, D2 |
| Configuration of chamfered portion | | | FIG. 2A | FIG. 2A | FIG. 2A | — | Rounded | Rounded | Rounded |
| Radius of curvature of rounded corner portion (mm) | Block on outer side in tread width direction | Corner portion A1 | 4 | 6 | 2 | — | — | — | — |
| | | Corner portion B1 | — | — | — | — | 2 | — | — |
| | | Corner portion C1 | — | — | — | — | — | 2 | — |
| | | Corner portion D1 | — | — | — | — | — | — | 2 |
| | Block on inner side in tread width direction | Corner portion A2 | 3 | 5 | 1.5 | — | — | — | — |
| | | Corner portion B2 | — | — | — | — | 1.5 | — | — |
| | | Corner portion C2 | — | — | — | — | — | 1.5 | — |
| | | Corner portion D2 | — | — | — | — | — | — | 1.5 |
| Groove width of widthwise groove | | | Gradually increasing | Gradually increasing | Gradually increasing | Gradually increasing | Gradually increasing | Gradually increasing | Gradually increasing |
| Drainage properties (INDEX) | | | 105 | 106 | 102 | 100 | 100 | 97 | 94 |
| Running performances on dry road surface (INDEX) | | | 100 | 99 | 100 | 100 | 100 | 98 | 99 |

It is understood from the results shown in Table 1 that the tires according to Examples 1 to 10 can improve drainage properties, while substantially ensuring satisfactory running performances on a dry road surface, as compared with the tires according to Comparative Examples 1 to 4. It is understood from comparing Example 1 with Example 2 that the tire of Example 1 provided with the chamfered portion only at a predetermined corner portion of each block exhibits better drainage properties than the tire of Example 2. It is understood from comparison of Examples 1, 6-8 that the tires of Examples 1, 7, 8 each having the radius of curvature R in the preferred range exhibits better drainage properties than the tire of Example 6. It is understood from comparing Example 1 with Example 5 that the tire of Example 1 where the radius of curvature R at the block corner portion A1 on the shoulder side is larger than the radius of curvature R at the block corner portion A2 on the CL side exhibits better drainage properties than the tire of Example 5 where the block corner portion A1 and the block corner portion A2 share the same radius of curvature R. Further, it is understood from comparing Example 1 with Example 10 that the tire of Example 1 where a groove width of each widthwise groove gradually increases toward the outer side in the tread width direction exhibits better drainage properties than the tire of Example 10.

Next, test tires of Examples 11 to 24 and Comparative Examples 5, 6 were prepared in order to confirm an effect of our tire. The relevant characteristics of each of the test tires are shown in Table 2. Each of the test tires having the tire size: 205/55R16 was assembled with a prescribed rim, inflated at internal pressure of 220 kPa, mounted on a vehicle, and subjected to actual vehicle tests for evaluating wet performance, on-snow performance, and running performances on a dry road surface described below.

<Wet Performance>

Wet performance of the tire was evaluated by: measuring a braking distance travelled by the vehicle originally running at 80 km/hour in a time period from application of full brakes thereto till the complete stop thereof on a test course covered with water (water depth: 7 mm); and calculating a reciprocal of the braking distance thus measured. The evaluation results are shown in Table 2. Evaluation was made by converting the reciprocal of the test tire to an index value relative to the result of Comparative Example 5 being "100" in Table 2. The larger index value represents the better wet performance of the tire.

<On-Snow Performance>

On-snow traction performance of the test tire was evaluated by: placing the vehicle on an snowy surface; counting time taken for the vehicle, after going full throttle from a standstill, to run at 30 km/hour; and calculating a reciprocal of the time thus counted. The results are shown in Table 2. Evaluation was made by converting the reciprocal to an index value relative to the reciprocal of Comparative Example 5 being "100" in Table 2. The larger index value represents the better on-snow performance of the tire.

<Running Performance on Dry Road Surface>

Running performance on a dry road surface, of the tire, was evaluated by: measuring a braking distance travelled by the vehicle originally running at 80 km/hour in a time period from application of full brakes thereto till the complete stop thereof on a dry road surface; and calculating a reciprocal of the braking distance thus measured. The evaluation results are shown in Table 2. Evaluation was made by converting the reciprocal of the test tire to an index value relative to the result of Comparative Example 5 being "100" in Table 2. The larger index value represents the better running performance on a dry road surface, of the tire.

TABLE 2

| | Example 11 | Comp. Example 5 | Comp. Example 6 | Example 12 | Example 13 | Example 14 | Example 15 | Example 16 | Example 17 | Example 18 | Example 19 | Example 20 | Example 21 | Example 22 | Example 23 | Example 24 |
|---|---|---|---|---|---|---|---|---|---|---|---|---|---|---|---|---|
| Ratio A/C | 0.11 | 0.17 | 1 | 0.3 | 0.24 | 0.17 | 0 | 0.11 | 0.11 | 0.11 | 0.11 | 0.11 | 0.17 | 0.11 | 0.08 | 0.33 |
| Ratio B/C | 0.33 | 1 | 0.5 | 0.33 | 0.33 | 0.33 | 0.33 | 0.7 | 0.6 | 0.42 | 0.07 | 0.03 | 0.5 | 0.67 | 0.23 | 0.33 |
| Cross sectional area A (mm$^2$) | 10 | 10 | 40 | 27 | 21.6 | 15.3 | 0 | 10 | 10 | 10 | 10 | 10 | 10 | 10 | 10 | 30 |
| Cross sectional area B (mm$^2$) | 30 | 60 | 20 | 30 | 30 | 30 | 30 | 81 | 54 | 37.8 | 6.3 | 2.7 | 30 | 60 | 30 | 30 |
| Cross sectional area C (mm$^2$) | 90 | 60 | 40 | 90 | 90 | 90 | 90 | 90 | 90 | 90 | 90 | 90 | 60 | 90 | 130 | 90 |
| Wet performance (INDEX) | 116 | 100 | 90 | 103 | 108 | 111 | 107 | 101 | 107 | 112 | 109 | 105 | 107 | 108 | 108 | 105 |
| On-snow performance (INDEX) | 111 | 100 | 95 | 100 | 104 | 107 | 104 | 105 | 104 | 103 | 104 | 105 | 104 | 105 | 106 | 102 |
| Running performances on dry road surface (INDEX) | 106 | 100 | 98 | 105 | 105 | 106 | 106 | 106 | 105 | 105 | 106 | 106 | 106 | 106 | 100 | 105 |

It is understood from the results shown in Table 2 that the tires according to Examples 11 to 24 each having an optimized relationship between A, B and C can achieve good results in both wet performance and on-snow performance in a compatible manner, as compared with the tires according to Comparative Examples 5 and 6. Further, it is understood from comparison of Examples 12 to 15 that the tires of Examples 13-15 each having an optimized value of the ratio A/C can achieve good results in both wet performance and on-snow performance at a more satisfactory level than the tire of Example 12. Yet further, it is understood from comparison of Examples 16 to 20 that the tires of Examples 17-19 each having an optimized value of the ratio B/C can achieve good results in both wet performance and on-snow performance at a more satisfactory level than the tires of Examples 16 and 20.

INDUSTRIAL APPLICABILITY

Accordingly, a pneumatic tire exhibiting improved drainability without sacrificing running performances on a dry road surface can be provided.

REFERENCE SIGNS LIST

1 Tread surface
2 Widthwise groove 3, 3a, 3b Circumferential groove
4 Block
5, 5a Corner portion
6 Chamfered portion
6a Tapered portion
7 Sipe
8a, 8b, 8c Connection portion
9 Raised-bottom portion
TE Tread end
CL Tire equatorial plane

The invention claimed is:

1. A pneumatic tire, comprising:
a tread surface;
a plurality of grooves, formed in the tread surface, including a plurality of widthwise grooves each extending from a corresponding tread end on the inner side in the tread width direction and a plurality of circumferential grooves each extending in the tread circumferential direction to intersect the widthwise grooves;
blocks demarcated by the plurality of grooves; and
a chamfered portion formed at a corner, on the trailing edge side and on the outer side in the tread width direction, of each block,
wherein provided that a cross sectional area of a connection portion at which an inner end portion in the tread with direction of each widthwise groove is connected with the circumferential groove is A (mm$^2$), a cross sectional area of a connection portion at which an end, on the one end side in the tread circumferential direction, of the circumferential groove is connected with the widthwise groove is B (mm$^2$), and a cross sectional area of a connection portion at which an outer end portion in the tread with direction of the widthwise groove is connected with a corresponding tread end is C (mm$^2$), A<C and B<C.

2. The pneumatic tire of claim 1, wherein the chamfered portion is formed only at the corner, on the trailing edge side and on the outer side in the tread width direction, of each block.

3. The pneumatic tire of claim 1, wherein the corner portion provided with the chamfered portion is rounded.

4. The pneumatic tire of claim 3, wherein a radius of curvature R of the rounded chamfered portion is in the range of 0.5 mm to 4.0 mm.

5. The pneumatic tire of claim 3, wherein, for at least one of pairs of respective two blocks adjacent to each other in the tread width direction in the same half region of the tread surface, spreading from the tire equatorial plane CL to the corresponding tread end TE in the tread width direction, a radius of curvature R1 (mm) of the rounded corner portion provided with the chamfered portion of one block situated on the outer side in the tread width direction, of the two blocks of each pair, is larger than a radius of curvature R2 (mm) of the rounded corner portion provided with the chamfered portion of the other block situated on the inner side in the tread width direction, of the two blocks of the pair.

6. The pneumatic tire of claim 1, wherein each widthwise groove gradually increases a groove width thereof toward the outer side in the tread width direction.

7. The pneumatic tire of claim 1, wherein one of the plurality of circumferential grooves extends in the tread circumferential direction in a tire center portion.

8. The pneumatic tire of claim 1, wherein a ratio A/C is in the range of 0 to 0.24.

9. The pneumatic tire of claim 1, wherein a ratio B/C is in the range of 0.10 to 0.60.

* * * * *